United States Patent
Abraham et al.

(10) Patent No.: US 11,405,969 B2
(45) Date of Patent: Aug. 2, 2022

(54) ENABLING INTERFACE AGGREGATION OF MOBILE BROADBAND NETWORK INTERFACES

(75) Inventors: Subil M. Abraham, Plano, TX (US); Vinod A. Bijlani, Pune (IN); Mathews Thomas, Flower Mound, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 12/893,350

(22) Filed: Sep. 29, 2010

(65) Prior Publication Data
US 2012/0077483 A1    Mar. 29, 2012

(51) Int. Cl.
| | |
|---|---|
| *H04W 76/15* | (2018.01) |
| *H04L 47/24* | (2022.01) |
| *H04W 4/60* | (2018.01) |
| *H04L 47/25* | (2022.01) |
| *H04W 48/18* | (2009.01) |

(Continued)

(52) U.S. Cl.
CPC ............ *H04W 76/15* (2018.02); *H04L 47/24* (2013.01); *H04L 47/25* (2013.01); *H04W 4/60* (2018.02); *H04W 48/18* (2013.01); *H04W 80/00* (2013.01); *H04W 88/06* (2013.01); *H04W 92/00* (2013.01)

(58) Field of Classification Search
USPC .................... 455/422.1, 450, 552.1
See application file for complete search history.

(56) References Cited

U.S. PATENT DOCUMENTS

| | | | |
|---|---|---|---|
| 6,785,149 B2 * | 8/2004 | Gilliland et al. | 361/796 |
| 7,197,046 B1 | 3/2007 | Hariharasubrahmanian | |

(Continued)

FOREIGN PATENT DOCUMENTS

| | | |
|---|---|---|
| CN | 103125141 A | 5/2013 |
| DE | 112011103289 T5 | 7/2013 |

(Continued)

OTHER PUBLICATIONS

Evensen et al.—A Network-Layer Proxy for Bandwidth Aggregation and Reduction of IP Packet Reordering; 2009 IEEE 34th Conference on Local Computer Networks (LCN 2009) Zurich, Switzerland; Oct. 20-23, 2009; pp. 585-592.

(Continued)

*Primary Examiner* — Gennadiy Tsvey
(74) *Attorney, Agent, or Firm* — Cuenot, Forsythe & Kim, LLC (57) ABSTRACT

A network traffic associated with a communication request within a computing device can be identified. The device can comprise of a first and second communication stack which can addresses a first and a second network interface within the computing device. The first network interface can be associated with a mobile broadband network and the second network interface can be associated with a computing network. A first and second portion of the network traffic associated with the communication request can be programmatically determined to be conveyed to the first and second network interfaces. The first and second portions of network traffic can be conveyed simultaneously to the mobile broadband network associated with the first network interface and the computing network associated with the second network interface.

12 Claims, 5 Drawing Sheets

(51) Int. Cl.
*H04W 92/00* (2009.01)
*H04W 80/00* (2009.01)
*H04W 88/06* (2009.01)

(56) References Cited

U.S. PATENT DOCUMENTS

| | | | |
|---|---|---|---|
| 7,469,295 B1* | 12/2008 | Gangadharan | 709/232 |
| 7,639,715 B1* | 12/2009 | O'Neil | H04L 69/16 |
| | | | 370/389 |
| 8,224,233 B2* | 7/2012 | Brisebois et al. | 455/1 |
| 9,877,342 B1 | 1/2018 | Zappaterra et al. | |
| 10,813,154 B2 | 10/2020 | Abraham et al. | |
| 2002/0035682 A1* | 3/2002 | Niemi | H04K 1/02 |
| | | | 713/151 |
| 2002/0141393 A1* | 10/2002 | Eriksson | H04W 80/06 |
| | | | 370/352 |
| 2004/0131078 A1* | 7/2004 | Gupta | H04L 12/5692 |
| | | | 370/466 |
| 2004/0176071 A1* | 9/2004 | Gehrmann | H04L 9/0844 |
| | | | 455/411 |
| 2005/0239497 A1* | 10/2005 | Bahl | H04L 12/5692 |
| | | | 455/552.1 |
| 2006/0023710 A1 | 2/2006 | Read | |
| 2006/0187880 A1 | 8/2006 | Choi | |
| 2006/0258408 A1* | 11/2006 | Tuomela | H04B 13/005 |
| | | | 455/569.1 |
| 2006/0274750 A1* | 12/2006 | Babbar | H04L 45/306 |
| | | | 370/390 |
| 2007/0073887 A1* | 3/2007 | Prasad | H04W 4/60 |
| | | | 709/227 |
| 2007/0195765 A1* | 8/2007 | Heissenbuttel | H04L 12/4641 |
| | | | 370/389 |
| 2007/0275683 A1* | 11/2007 | Songer | H04B 1/005 |
| | | | 455/185.1 |
| 2008/0043742 A1* | 2/2008 | Pong | G06F 13/4022 |
| | | | 370/394 |
| 2008/0165709 A1 | 7/2008 | Soliman | |
| 2008/0220788 A1* | 9/2008 | Stanwood et al. | 455/450 |
| 2008/0268778 A1* | 10/2008 | De La Garrigue | H01Q 19/106 |
| | | | 455/41.2 |
| 2009/0187674 A1* | 7/2009 | Lee | H04L 29/12216 |
| | | | 709/250 |
| 2009/0265752 A1 | 10/2009 | Sharif-Ahmadi et al. | |
| 2009/0268605 A1* | 10/2009 | Campbell et al. | 370/216 |
| 2010/0062800 A1 | 3/2010 | Gupta et al. | |
| 2010/0069097 A1* | 3/2010 | Chin | H04W 4/14 |
| | | | 455/466 |
| 2010/0085895 A1 | 4/2010 | Bajko | |
| 2010/0091653 A1 | 4/2010 | Koodli et al. | |
| 2010/0107154 A1* | 4/2010 | Brahmavar et al. | 717/176 |
| 2010/0153969 A1* | 6/2010 | Dyba | H04L 69/14 |
| | | | 719/315 |
| 2010/0161831 A1 | 6/2010 | Haas et al. | |
| 2010/0195489 A1* | 8/2010 | Zhou et al. | 370/216 |
| 2010/0302958 A1* | 12/2010 | Wietfeldt | H04W 76/15 |
| | | | 370/252 |
| 2011/0022812 A1* | 1/2011 | van der Linden et al. | 711/163 |
| 2011/0149764 A1* | 6/2011 | Wietfeldt | H04W 88/06 |
| | | | 370/252 |
| 2011/0154345 A1* | 6/2011 | Kruglick | 718/103 |
| 2011/0199989 A1* | 8/2011 | Wietfeldt | H04W 72/1215 |
| | | | 370/329 |
| 2011/0222545 A1* | 9/2011 | Eleftheriadis | 370/394 |
| 2011/0314512 A1* | 12/2011 | Sinha | H04W 12/12 |
| | | | 726/1 |
| 2011/0319089 A1 | 12/2011 | Sharma et al. | |
| 2012/0057511 A1* | 3/2012 | Sivakumar et al. | 370/310 |
| 2017/0086243 A1 | 3/2017 | Abraham et al. | |

FOREIGN PATENT DOCUMENTS

| | | |
|---|---|---|
| GB | 2394865 A | 5/2004 |
| GB | 2498147 A | 7/2013 |
| WO | 2008043216 A1 | 4/2008 |
| WO | 2008109415 A1 | 9/2008 |
| WO | 2008137132 A2 | 11/2008 |
| WO | 2009095863 A2 | 8/2009 |
| WO | 2010108144 A1 | 9/2010 |
| WO | 2012041604 A1 | 4/2012 |

OTHER PUBLICATIONS

PCT ISR and written opinion.
Fernandez, J.C., et al., "Bandwidth Aggregation-Aware Dynamic QoS Negotiation for Real-Time Video Streaming in Next-Generation Wireless Networks", IEEE Transactions on Multimedia, vol. 11, No. 6, pp. 1082-1093, Oct. 6, 2009.
WIPO Appln. PCT/EP2011/064283, International Search Report, dated Nov. 4, 2011, 4 pg.
WIPO Appln. PCT/EP2011/064283, Written Opinion, dated Nov. 4, 2011, 8 pg.
WIPO Appln. PCT/EP2011/064283, International Preliminary Patentability Report, dated Apr. 2, 2013, 9 pg.
"OSI Model," [online] Wikipedia, <https://en.wikipedia.org/wiki/OSI_model>, retrieved Aug. 23, 2018), 3 pg.
U.S. Appl. No. 15/365,774, Non-Final Office Action, dated Nov. 3, 2017, 21 pg.
U.S. Appl. No. 15/365,774, Final Office Action, dated Mar. 9, 2018, 31 pg.
U.S. Appl. No. 15/365,774, Examiner's Answer, Sep. 19, 2018, 39 pg.
U.S. Appl. No. 15/365,774, Decision on Appeal, dated Apr. 29, 2020, 11 pg.
U.S. Appl. No. 15/365,774, Notice of Allowance, dated Jun. 12, 2020, 13 pg.

* cited by examiner

ENABLING INTERFACE AGGREGATION OF MOBILE BROADBAND NETWORK INTERFACES

BACKGROUND

The present disclosure relates to the field of network communications and, more particularly, to enabling interface aggregation of mobile broadband network interfaces.

Mobile computing devices (e.g., mobile phones) are becoming increasingly versatile and feature rich. Many of these mobile computing devices are equipped with multiple forms of network access which can include mobile broadband (e.g., 3G), and wireless broadband (e.g., Wi-MAX). These wireless broadband technologies (e.g., Wi-Fi, LTE) traditionally provide users with Internet access. Frequently, only a portion of the total bandwidth of a mobile broadband connection can be available due to connectivity issues such as limited coverage areas and radio frequency interference. As such, users can experience long wait times when interacting with Internet resources due to high latency as a result of these connectivity issues. For instance, content dense Web sites can be result in significant delays due to high latency on mobile broadband networks.

Currently, users must choose which mobile broadband technology is preferred (e.g., Wi-Fi) and utilize that mobile broadband service only. In many instances, applications executing on mobile phones are utilizing increasing amounts of bandwidth of mobile broadband connections. Frequently, the broadband connection can be outpaced by the application executing on the mobile device. That is, it is not uncommon for a broadband connection can become saturated by one network-based application executing on a mobile device, leaving the user unable to utilize other network-centric applications until the broadband connection is available. This negatively affects user experience since the mobile device can permit the use of multiple network-based applications simultaneously.

In many situations, several methods of connectivity can be available to users such as access to multiple hotspots (e.g., wireless access points), wired connectivity, and mobile broadband access. For example, many coffee houses (e.g., STARBUCKS) offer Wi-Fi hotspots which customers can take advantage of during their patronage by connecting their mobile devices to the provided Wi-Fi network. Consequently, available broadband connections (e.g., 3G mobile broadband) can go unused. Consequently, the user experience is becoming increasingly degraded by lack of connectivity options and bandwidth availability.

SUMMARY

A network traffic associated with a communication request within a computing device can be identified. The device can be comprise of a first and second communication stack which can address a first and a second network interface within the computing device. The first network interface can be associated with a mobile broadband network and the second network interface can be associated with a computing network. A first and second portion of the network traffic associated with the communication request can be programmatically determined to be conveyed to the first and second network interfaces. The first and second portions of network traffic can be conveyed simultaneously to the mobile broadband network associated with the first network interface and the computing network associated with the second network interface.

DETAILED DESCRIPTION

The present disclosure is a solution for enabling interface aggregation of mobile broadband network interfaces. In the solution, a mobile broadband network interface can be combined with another network interface to obtain improved bandwidth. The mobile broadband network interface can be an interface associated with a mobile phone network such as a Long Term Evolution (LTE) network. The combined network interfaces can be addressed as a logical interface via a network fusion communication stack. That is, the heterogeneous network interfaces can be utilized as a single network interface to enhance network speeds on a computing device.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1A:
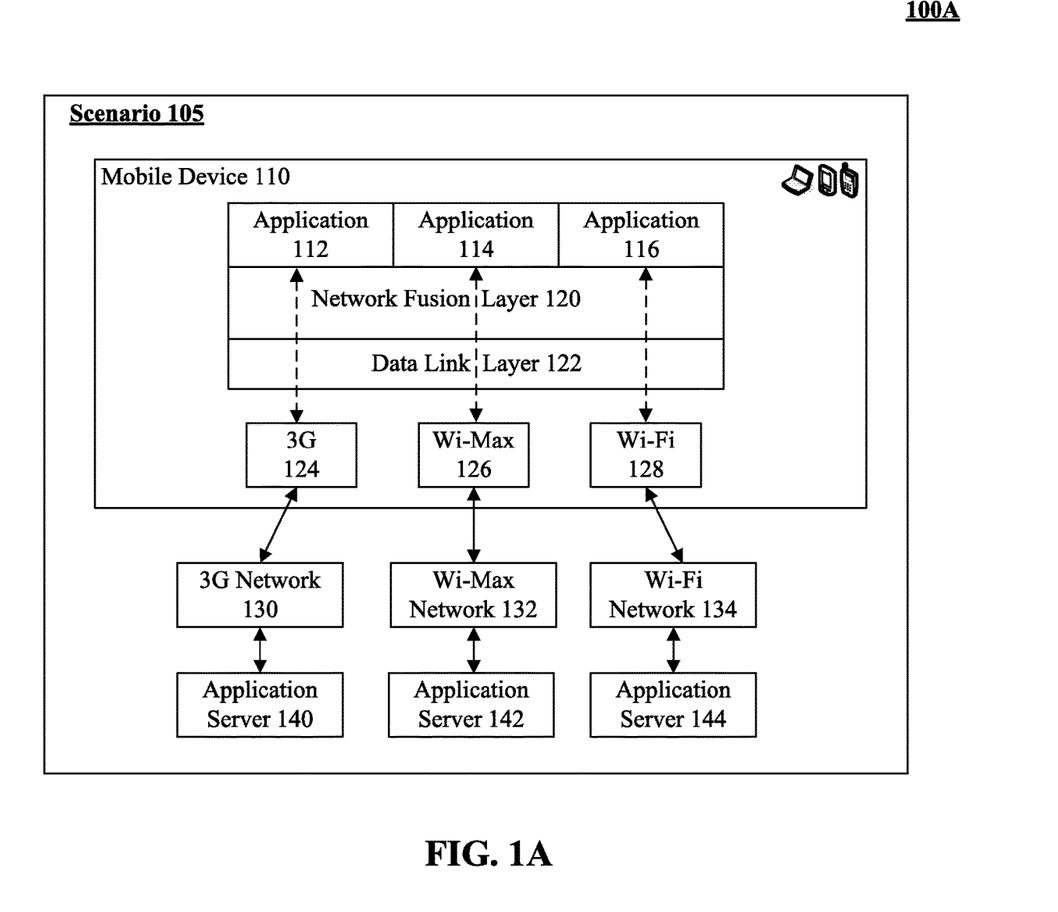
FIG. 1A is a schematic diagram illustrating a scenario for enabling interface aggregation of mobile broadband network interfaces in accordance with an embodiment of the inventive arrangements disclosed herein.
Figure 1B:
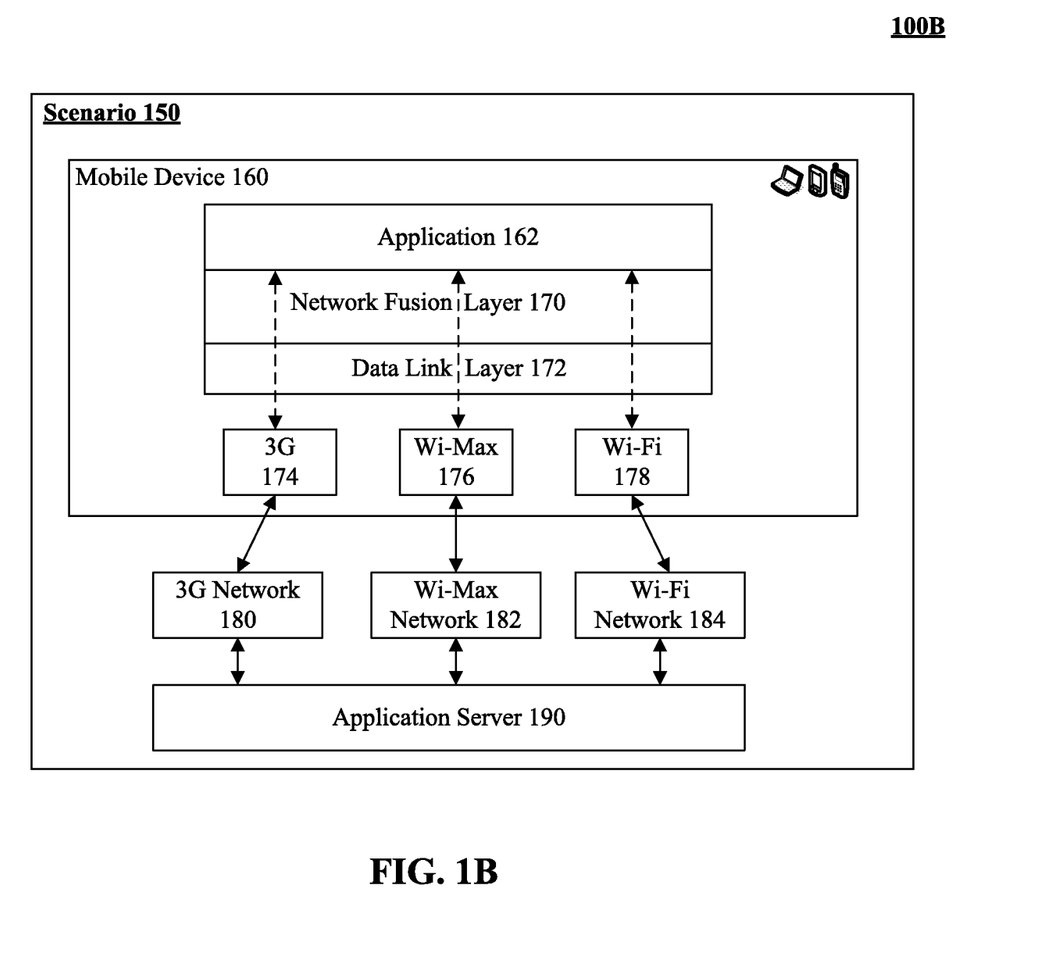
FIG. 1B is a schematic diagram illustrating a scenario for enabling interface aggregation of mobile broadband network interfaces in accordance with an embodiment of the inventive arrangements disclosed herein.

FIG. 1A and FIG. 1B is a schematic diagram 110A, 100B illustrating a scenario 105, 150 for enabling interface aggregation of mobile broadband network interfaces in accordance with an embodiment of the inventive arrangements disclosed herein. In the scenario 105, 150, network fusion layer 120, 170 can enable multiple mobile broadband interfaces associated with network interfaces 124-128, 174-178 to be utilized simultaneously. That is, network fusion layer 120, 170 can permit seamless aggregation of broadband interfaces into a logical network interface which can be protocol independent. Consequently, mobile device 110, 160 network traffic can be transparently and easily communicated across any combination of the aggregated interfaces 124-128, 174-178 enabling maximum bandwidth utilization. For instance, application 112 can utilize a third generation (3G) interface 124 and Wi-Fi interface 128 simultaneously to communicate with application server 140.

In the scenario 105, 150, mobile device 110, 160 can comprise of network fusion layer 120, 170. Network fusion layer 120, 170 can replace and/or supplement a traditional communication stack within device 110, 160. In one instance, network fusion layer 120, 170 can reside within a communication stack between the application layer and the data link layer conforming to the Open Systems Interconnect (OSI) model. Thus, the network fusion layer is an additionally layer of abstraction, which interfaces with subordinate and superior layers. Consequently, existing software/hardware operating at any of the traditional layers of abstraction (of the OSI) model will be able to seemly interoperate with the network fusion layer. In one embodiment, optimizations can be implemented so that the network fusion layer results in some changes to the data link layer and/or application layer instead of being implemented as a separate, discrete layer of abstraction.

Mobile device 110, 160 can be hardware/software computing device capable of interfacing with at least two or more broadband networks. Mobile device 110, 160 can include, but is not limited to, mobile phone, laptop, netbook, mobile computing device (e.g., tablet), portable multimedia player, portable digital assistant, and the like. Mobile device 110, 160 can include two or more network interfaces 124-126, 174-178 able to communicate with mobile broadband networks. Mobile device 110, 160 can execute one or more applications 112-116, 162.

Applications 112-116, 162 can include, but are not limited to, firmware applications, software applications, and the like. Applications 112-116, 162 can communicate with application servers 140-144, 190 which can generate network traffic (e.g., dashed lines). For example, applications 112-116 can be mobile applications such as a Web browser, email client, and calendar application. Network traffic can be conveyed over network interfaces 124-128, 174-178.

Network interfaces 124-128, 174-178 can be a hardware/software modems enabling connectivity to broadband networks. Network interfaces 124-128, 174-178 can include, but is not limited to, cellular modems, wireless modems, and the like. Interfaces 124-128, 174-178 can be located internally and/or externally to mobile device 110, 160. For instance, network interface 124 can be a Universal Mobile Telecommunications System portable computer (PC) card.

Networks 130-134, 180-184 associated with interfaces 124-128, 174-178 can be communication networks enabling access to local and/or remote resources. For example, networks can enable Internet access for mobile devices 110, 160. Networks 130-134, 180-184 can include, but are not limited to mobile phone networks, cellular networks, telephony networks, wireless wide area networks (WAN), wired networks, and the like. Interfaces 124-128, 174-178 can be associated with networks 130-134, 180-184 which can permit communicate with mobile device 110, 160 applications 112-116, 162 in one or more traditional fashions.

Fusion layer 120, 170 can facilitate communication between applications 112-116, 162 and data link layer 122, 172 by providing protocol translation when necessary. Layer 120, 170 can provide traditional and/or proprietary communication functionality for the aggregated interfaces 130-134, 180-184. That is, applications 112-116, 162 can require no modification to utilize the aggregated bandwidth provided by layer 120, 170. Layer 120, 170 can provide communication data formatting, session control, transport management, network routing, and the like.

It should be appreciated conventional interface aggregation management functions can be present within layer 120, 170. Interface aggregation management functions can include, but is not limited to, load balancing, interface discovery, interface configuration, fault tolerance, frame ordering, frame synchronization, security, and the like. In one instance, layer 120, 170 can be configured to utilize one or more specific interfaces based on network traffic content type, available bandwidth, application type, and the like. For example, low bandwidth connections can be preferred when application network traffic is not time critical enabling higher bandwidth connections to be free for use by real-time applications. It should be noted, layer 120, 170 can be configured to permit arbitrarily granular control over network traffic within mobile device 110, 160. Control can include, application session control, protocol control, frame control, packet control, and the like. For instance, individual packets can be routed over multiple interfaces 124-128 (e.g., data stripping).

In scenario 105, applications 112-116 can communicate individually with application servers 140-144. Network fusion layer 120 can independently manage the communication between each application 112-116, data link layer 122, and application server 140-144. That is, each application 112-116 can have a dedicated interface 124-128 for communicating with application server 140-144. In another embodiment, layer 120 can dynamically manage application traffic based on one or more prioritization criteria. Prioritization criteria can include application prioritization, network prioritization, interface prioritization, and the like.

In scenario 150, application 162 can communicate with application server 190 utilizing interfaces 174-178. Layer 170 can perform multi-link routing for application 162 network traffic across interfaces 174-178 based on one or more conditions. Conditions can include, but is not limited to, heuristically determined settings, user-established configuration parameters, and the like. For instance, a portion of a Web page request can be communicated over each interface: JAVASCRIPT content can be conveyed over interface 174, Hypertext Markup Language (HTML) content can be communicated via interface 176, and images can be conveyed using interface 178. In this way, each interface can be optimally utilized based on network bandwidth, latency, and the like.

As used herein, mobile broadband networks can include, but is not limited to 3G mobile phone networks, 4G mobile phone networks, Long Term Evolution (LTE) networks, Global System for Mobile Communications (GSM) networks, Code Division Multiple Access (CDMA) network, Wi-Fi network, Worldwide Interoperability for Microwave Access (Wi-MAX) network, wired networks, and the like.

Drawings presented herein are for illustrative purposes only and should not be construed to limit the disclosure in any regard. It should be appreciated networks associated with scenario 105, 150 can include circuit switched networks, packet switched networks, and the like. It should be appreciated, networks 180-184 can support multi-link routing permitting distributed traffic to be conveyed between mobile device 160 and application server 190. That is, scenario 150 demonstrates a system in which the fusion layer exists within a mobile device and another end-point computing device (e.g., gateway router) permitting the scenarios to occur.

Figure 2:
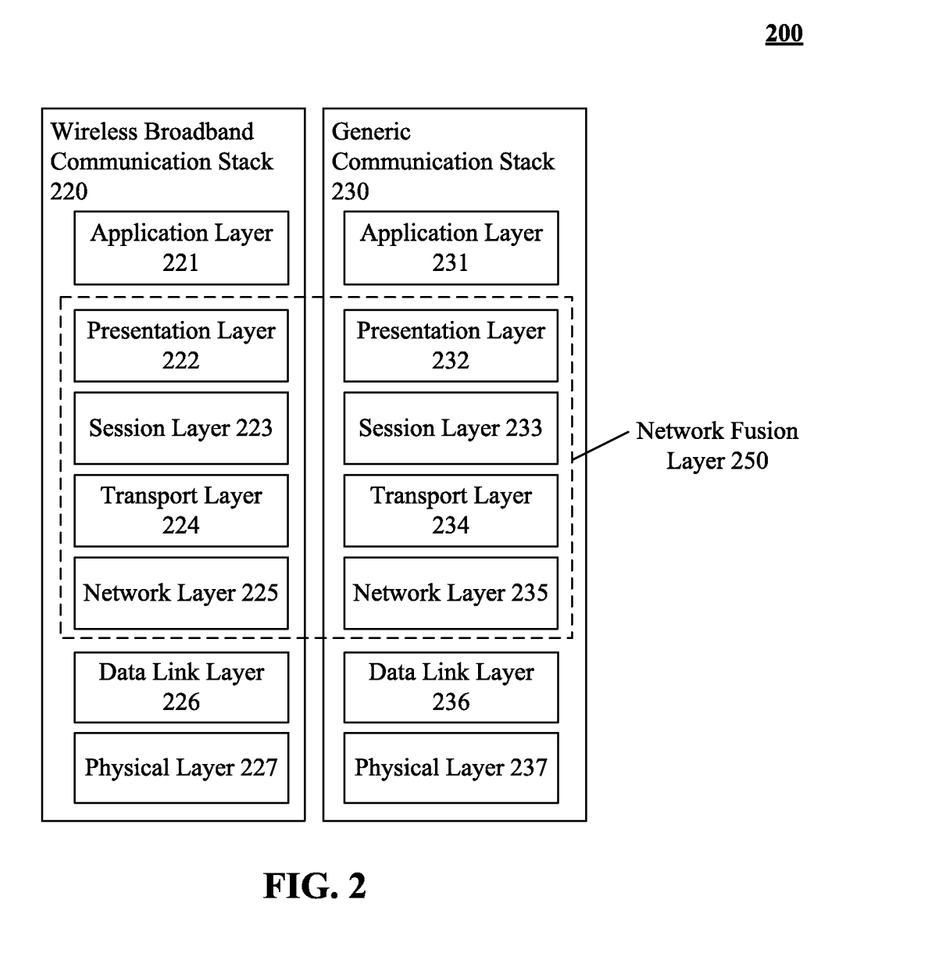
FIG. 2 is a schematic diagram illustrating a model of a communication stack for enabling interface aggregation of mobile broadband network interfaces in accordance with an embodiment of the inventive arrangements disclosed herein.

FIG. 2 is a schematic diagram illustrating a model 200 of a communication stack for enabling interface aggregation of mobile broadband network interfaces in accordance with an embodiment of the inventive arrangements disclosed herein. Model 200 can be present in the context of scenarios 105, 150, and system 300, 400. Model 200 can include a group of network communication layers conforming to an Open Systems Interconnect (OSI) model.

Model 200 can be two or more hardware/software communication stacks associated with a computing device (e.g., router). Model 200 can comprise of wireless broadband communication stack 220 and generic communication stack 230. Network fusion layer 250 can include portions (e.g., layers) of communication stacks including, but not limited to, wireless broadband communication stack 220, generic communication stack 230, wired communication stack, and the like.

Communication stack 220, 230 can be a hardware/software communication stack associated with a wireless broadband technology and/or wired broadband technology. It should be appreciated stacks 220, 230 can include, but is not limited to layers 221-227, 231-237. Communication stacks 220, 230 can include, but are not limited to, 3G/4G compliant stack, 802.3, 802.11, 802.15, 802.16, and the like. For instance, stack 220 can be a Wireless Application Protocol stack and stack 230 can be a Transport Control Protocol/Internet Protocol (TCP/IP) communication stack. That is, the disclosure can enable management of differing protocol stacks having heterogeneous layer formations.

In model 200, layers 222-225, 232-235 can exist within a network fusion layer 250. In one instance, network fusion layer 250 can be a wrapper implementation. In the instance, layer 250 can be a wrapper software driver able to manage traditional and/or proprietary layers 222-225, 232-235 within stacks 220, 230 uniformly. For example, layer 250 can be a third party software driver enabling control over operating system level communication stacks 220, 230. In another instance, layers 222-225, 232-235 can be specialized network fusion layers able to be synchronized during interface aggregation.

In one instance, network fusion layer 250 can be one or more micro-layers within a communication stack. In the instance, layer 250 can be a combination of multiple micro-layers that control the mediation between different technology protocols providing bandwidth improvement, high availability, and security.

It should be appreciated model 200 represents one implementation of the disclosure and should not be construed to limit the disclosure in any regard. Layers within model 200 can be omitted and/or combined based on communication stack implementation (e.g., TCP/IP). In one embodiment, model 200 can be a portion of a networking application programming interface permitting interface aggregation to be performed trivially (e.g., via function calls).

Figure 3:
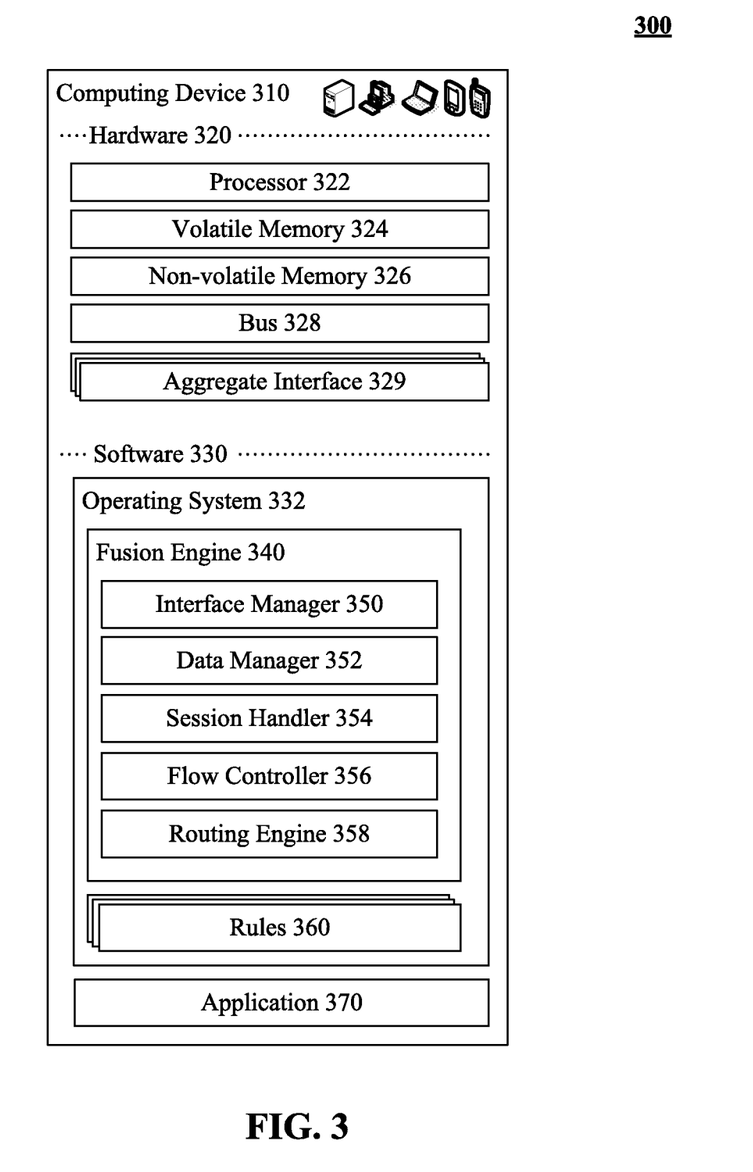
FIG. 3 is a schematic diagram illustrating a system for enabling interface aggregation of mobile broadband network interfaces in accordance with an embodiment of the inventive arrangements disclosed herein.

FIG. 3 is a schematic diagram illustrating a system 300 for enabling interface aggregation of mobile broadband network interfaces in accordance with an embodiment of the inventive arrangements disclosed herein. System 300 can be present in the context of scenario 105, 150, model 200, 400. In system 300, a computing device 310 can utilize fusion engine 340 to achieve broadband interface aggregation between heterogeneous broadband interfaces. System 300 can enable broadband interface aggregation within any network configuration including, but not limited to, client-server, peer-to-peer, and the like.

Computing device 310 can be a hardware/software computing entity able to execute fusion engine 340, operating system 332, and/or applications 370. Computing device 310 can comprise of hardware 320 and software 330. Device 310 can be a mobile computing device, a router, network gateway device, and the like. For instance, device 310 can be a Wireless Application Protocol gateway configured to support interface aggregation.

Fusion engine 340 can be a hardware/software component enabling broadband interface aggregation (e.g., aggregate interface 329). Engine 340 can comprise of, but is not limited to, interface manager 350, data manager 352, session handler 354, flow controller 356, routing engine 358, and the like. In one instance, engine 340 can be a component of an operating system 332. For example, engine 340 can be a operating system communication driver. It should be appreciated, engine 340 enables applications 370 to utilize any interface available without requiring the application 370 to perform any specialized communication. For instance, a Wireless Application Protocol (WAP) enabled application can utilize a Wi-Fi interface which can conform to Transport Control Protocol/Internet Protocol.

Interface manager 350 can be a hardware/software component for managing interface 329. Manager 350 can perform interface 329 changes including, but not limited to, interface activation, interface deactivation, interface configuration, and the like. Manager 350 can interact with engine 340 components to permit persistent interface aggregation. In one embodiment, manager 350 can permit to interface customization by utilizing location profiles (e.g., rules 360). For example, manager 350 can aggregate Ethernet and WiFi interfaces when a user is in their office and a 3G and Wi-MAX interface when the user is away from their office.

Data manager 352 can be a hardware/software component for organizing network traffic data associated with interface 329. Manager 352 functionality can include, but is not limited to formatting conversion, data structure management, serialization, encryption, and the like. For example, manager 352 can convert network payload data in real-time from Wireless Markup Language to an Extensible Markup Language (XML) format. In one embodiment, manager 352 can be used to encrypt and/or decrypt network traffic data from protocols associated with the aggregated interfaces. That is, manager 352 can enable any application 370 to utilize any interface within aggregate interface 329 transparently, regardless of encryption schemes and/or security protocols associated with the interface.

Session handler 354 can be a hardware/software component for establishing and maintaining a session between application 370 and/or application 370 services. Handler 354 can provide, but is not limited to, session authentication, synchronization, session check-pointing, and the like. Handler 354 can be customized to enable session tracking for the aggregate interface 329, each interface within aggregate interface 329, and the like. Handler 354 can permit request/response transmissions to occur over any interface 329. For example, a request can be conveyed over a 3G interface and the corresponding response can be received via a Worldwide Interoperability for Microwave Access (WiMAX) interface.

Flow controller 356 can be a hardware/software component for synchronizing network traffic flow between application 370 and remote resources over aggregate interface 329. Controller 356 functionality can include, but is not limited to, flow control, reliability, ordering, and the like. Flow controller 356 can utilize traditional and/or proprietary checksums to enable data integrity to be maintained. In one instance, controller 356 can utilize volatile memory 324 as a buffer during data ordering and/or flow control operations. Controller 356 protocols can include, but is not limited to Transport Control Protocol (TCP), User Datagram Protocol (UDP), Datagram Congestion Control Protocol (DCCP) and the Stream Control Transmission Protocol (SCTP), and the like.

Routing engine 358 can be a hardware/software entity for routing network traffic data associated with application 370. Engine 358 can perform connectionless communication, connection-oriented communication, host addressing, message forwarding, and the like. Engine 358 can permit multi-link routing for interface 329 which can include the routing of network traffic associated with local network addresses, public network addresses, and the like.

Rules 360 can be one or more policies for configuring the behavior of fusion engine 340. Rules 360 can include application client interface rules, network interface discovery rules, data splitting rules, data merging rules, and the like. Rules 360 can be used to accommodate different protocol stacks including traditional and/or proprietary communication stacks. In one instance, rules 360 can be established for each interface, protocol, source, destination, and the like.

Application 370 can be a executable code able to communicate with an application server. Application 370 can be, but is not limited to, a mobile application (e.g., client-side), server application, application suite, enterprise software, and the like. Application 370 can interact with aggregate interface 329 in a traditional manner via fusion engine 340. It should be appreciated application 370 can reside external to device 310 (e.g., Web service) based on device 310 embodiment, (e.g., network router).

Drawings presented herein are for illustrative purposes only and should not be construed to limit the disclosure any regard. System 300 can be a stand-alone computing device, network computing device, distributed computing device, and the like. Hardware 320 can be physical computing components permitting installation and execution of software 330. Hardware 320 can include, but is not limited to, processor 322, volatile memory 324, non-volatile memory 326, bus 328, and the like. Operating system 330 can include, software, firmware, and the like.

Figure 4:
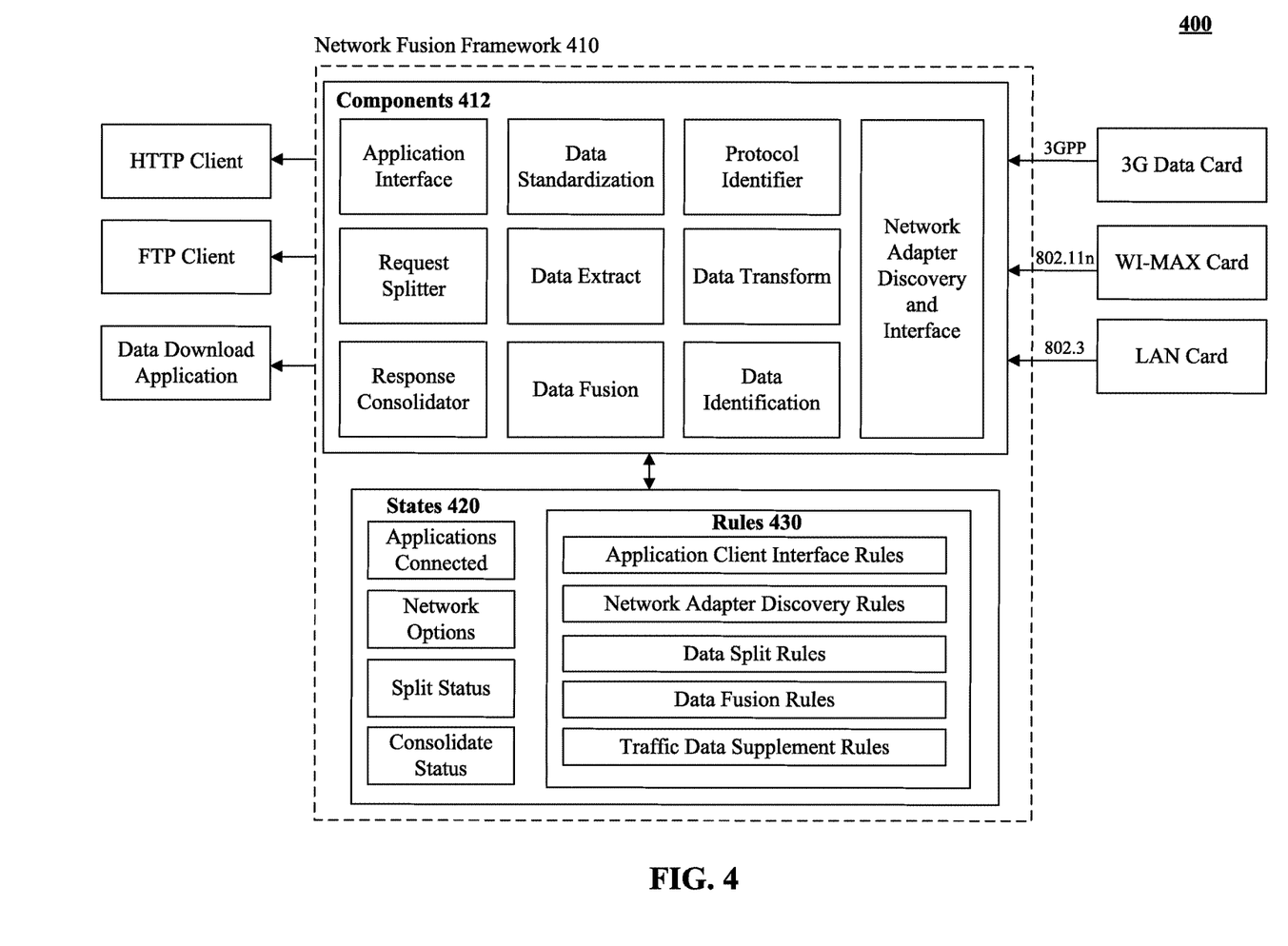
FIG. 4 is a schematic diagram illustrating a system for enabling interface aggregation of mobile broadband network interfaces in accordance with an embodiment of the inventive arrangements disclosed herein.

FIG. 4 is a schematic diagram illustrating a system 400 for enabling interface aggregation of mobile broadband network interfaces in accordance with an embodiment of inventive arrangements disclosed herein. System 400 exemplifies one embodiment of a network fusion framework 410. Framework 410 can comprise of, but is not limited to, components 412, states 420, rules 430, and the like. System 400 can be a portion of a network management tool within a computing device (e.g., laptop connection manager). For example, system 400 can be configured via an IBM THINKVANTAGE ACCESS CONNECTIONS software utility.

In one embodiment, rules 430 can permit customization for multiple protocols, environments, and the like. In the embodiment, rules 430 can permit configuration of individual components 412. It should be appreciated, components 412 can provide self-testing functionality, operational statistics, state information and the like.

The flowchart and block diagrams in the FIGS. 1-4 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method within a computer hardware system implementing an application layer, a network fusion layer, and a data link layer, comprising:
   identifying, using the network fusion layer, a first portion of network traffic originating from a first application in the application layer and a second portion of the network traffic originating from a second application in the application layer; and
   dynamically routing, using the network fusion layer employing prioritization criteria and a location profile, each of the first and second portions of the network traffic to one or more of a plurality of network interfaces, wherein
   the identifying and the dynamically routing of the first and second portions occur simultaneously,
   the network fusion layer is configured to simultaneously route sub-portions of the first portion respectively to a first network interface and another network interface of the plurality of network interfaces,
   the network fusion layer uses the location profile to determine a particular combination of the plurality of network interfaces to which to route the network traffic based upon a location of the computer hardware system, and
   the network fusion layer includes:
      a data composer configured to assemble and disassemble a communication request associated with the network traffic,
      a session handler configured to establish a communication session between a source entity and at least one destination entity associated with the network traffic, and
      a flow controller configured to moderate transmission speed of the network traffic transmitted over a plurality of network links.

2. The method of claim 1, wherein the network fusion layer is configured to perform:
   identifying a state change of one of the plurality of network interfaces; and
   automatically deactivating the one of the plurality of network interfaces.

3. The method of claim 1, wherein the network fusion layer is configured to perform:
   receiving a communication request with a network access protocol destined to an interface having a different network access protocol;
   translating the communication request into the different network access protocol; and
   conveying the communication request over the interface via the different network access protocol.

4. The method of claim 1, wherein the network fusion layer includes:
   a network interface manager configured to manage the plurality of the network interfaces respectively associated with a plurality of network links; and
   a routing engine configured to convey at least a portion of the communication request to the source entity and the at least one destination entity utilizing the plurality of network links.

5. A computer hardware system implementing an application layer, a network fusion layer, and a data link layer, comprising:
   a hardware processor configured to initiate the following executable operations:
      identifying, using the network fusion layer, a first portion of network traffic originating from a first application in the application layer and a second portion of the network traffic originating from a second application in the application layer; and
      dynamically routing, using the network fusion layer employing prioritization criteria and a location profile, each of the first and second portions of the network traffic to one or more of a plurality of network interfaces, wherein
   the identifying and the dynamically routing of the first and second portions occur simultaneously,
   the network fusion layer is configured to simultaneously route sub-portions of the first portion respectively to a first network interface and another network interface of the plurality of network interfaces,
   the network fusion layer uses the location profile to determine a particular combination of the plurality of network interfaces to which to route the network traffic based upon a location of the computer hardware system, and
   the network fusion layer includes:
      a data composer configured to assemble and disassemble a communication request associated with the network traffic,
      a session handler configured to establish a communication session between a source entity and at least one destination entity associated with the network traffic, and
      a flow controller configured to moderate transmission speed of the network traffic transmitted over a plurality of network links.

6. The system of claim 5, wherein the network fusion layer is configured to perform:
   identifying a state change of one of the plurality of network interfaces; and
   automatically deactivating the one of the plurality of network interfaces.

7. The system of claim 5, wherein the network fusion layer is configured to perform:
   receiving a communication request with a network access protocol destined to an interface having a different network access protocol;
   translating the communication request into the different network access protocol; and conveying the communication request over the interface via the different network access protocol.

8. The system of claim 5, wherein the network fusion layer includes:
a network interface manager configured to manage the plurality of the network interfaces respectively associated with a plurality of network links; and
a routing engine configured to convey at least a portion of the communication request to the source entity and the at least one destination entity utilizing the plurality of network links.

9. A computer program product, comprising:
a hardware storage device having stored therein computer usable program code,
the computer usable program code, which when executed by a computer hardware system implementing an application layer, a network fusion layer, and a data link layer, causes the computer hardware system to perform:
identifying, using the network fusion layer, a first portion of network traffic originating from a first application in the application layer and a second portion of the network traffic originating from a second application in the application layer; and
dynamically routing, using the network fusion layer employing prioritization criteria and a location profile, each of the first and second portions of the network traffic to one or more of a plurality of network interfaces, wherein
the identifying and the dynamically routing of the first and second portions occur simultaneously,
the network fusion layer is configured to simultaneously route sub-portions of the first portion respectively to a first network interface and another network interface of the plurality of network interfaces,
the network fusion layer uses the location profile to determine a particular combination of the plurality of network interfaces to which to route the network traffic based upon a location of the computer hardware system, and the network fusion layer includes:
a data composer configured to assemble and disassemble a communication request associated with the network traffic,
a session handler configured to establish a communication session between a source entity and at least one destination entity associated with the network traffic, and
a flow controller configured to moderate transmission speed of the network traffic transmitted over a plurality of network links.

10. The computer program product of claim 9, wherein the network fusion layer is configured to perform:
identifying a state change of one of the plurality of network interfaces; and
automatically deactivating the one of the plurality of network interfaces.

11. The computer program product of claim 9, wherein the network fusion layer is configured to perform:
receiving a communication request with a network access protocol destined to an interface having a different network access protocol;
translating the communication request into the different network access protocol; and
conveying the communication request over the interface via the different network access protocol.

12. The computer program product of claim 9, wherein the network fusion layer includes:
a network interface manager configured to manage the plurality of the network interfaces respectively associated with a plurality of network links; and
a routing engine configured to convey at least a portion of the communication request to the source entity and the at least one destination entity utilizing the plurality of network links.

* * * * *